US012769941B2

(12) United States Patent
Karia et al.

(10) Patent No.: US 12,769,941 B2
(45) Date of Patent: Oct. 20, 2026

(54) ELECTRONIC MESSAGE HEADER RECOMMENDATION AND APPROVAL

(71) Applicant: International Business Machines Corporation, Armonk, NY (US)

(72) Inventors: Jignesh K. Karia, Thane (IN); Mukundan Sundararajan, Bangalore (IN); Pankaj Satyanarayan Dayama, Bangalore (IN); Neha Shah, Kolkata (IN); Vishal Awal, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 1316 days.

(21) Appl. No.: 17/374,075

(22) Filed: Jul. 13, 2021

(65) Prior Publication Data

US 2023/0023325 A1 Jan. 26, 2023

(51) Int. Cl.
*G06F 40/258* (2020.01)
*G06F 40/295* (2020.01)

(52) U.S. Cl.
CPC .......... *G06F 40/258* (2020.01); *G06F 40/295* (2020.01)

(58) Field of Classification Search
CPC .... G06F 40/258; G06F 40/295; G06F 40/137; G06F 40/216; G06F 40/226; G06F 40/56; G06F 16/90344; G06F 18/2113; G06F 18/2148; G06F 18/231; G06F 40/30; G06F 18/22; G06F 16/355; G06F 16/9535;

(Continued)

(56) References Cited

U.S. PATENT DOCUMENTS

2011/0294479 A1* 12/2011 Kumar .................... H04W 4/14 455/415
2013/0310013 A1 11/2013 Cai et al.
(Continued)

FOREIGN PATENT DOCUMENTS

CN 109299477 A * 2/2019 ........... G06F 40/258
WO WO-2019118469 A2 * 6/2019 ............ G06Q 50/10

OTHER PUBLICATIONS

Chen J. "For Generating a Text Title of Method And Device", English translated (Year: 2019).*
(Continued)

*Primary Examiner* — Wesley L Kim
*Assistant Examiner* — Erkin Abdullaev
(74) *Attorney, Agent, or Firm* — Scully, Scott, Murphy & Presser, P. C.; Monchai Chuaychoo, Esq.

(57) ABSTRACT

Recommendation and approval of a header for a message includes generating a proposed header based on the name and/or brand of the entity and product and/or content of the message, classifying the proposed header using a machine learning model trained based on historical complaints on previously used headers related to the entity name and brand and product and/or content of the message and recommending the proposed header based on the classification. The training of the machine learning model may include learning a threshold wherein headers having a classification greater than the threshold are not recommended as having a high probability of being wrongly associated with the requesting entity and headers having a classification lower than the threshold are recommended as having a high probability of not being wrongly associated with the requesting entity.

20 Claims, 6 Drawing Sheets

(58) Field of Classification Search
CPC .... G06F 40/169; G06F 40/284; G06F 40/211; G06F 40/44; H04W 4/14; H04W 4/06; G06Q 10/107; G06Q 30/0276; G06N 20/00; G06N 3/044; G06N 3/045; G06N 7/01; G06N 3/084
See application file for complete search history.

(56) References Cited

U.S. PATENT DOCUMENTS

| | | | | |
|---|---|---|---|---|
| 2017/0193545 | A1* | 7/2017 | Zhou | G06Q 30/0254 |
| 2018/0034755 | A1* | 2/2018 | Saoji | G06F 40/10 |
| 2018/0308003 | A1* | 10/2018 | Singh | G06N 20/00 |
| 2018/0337878 | A1* | 11/2018 | Sathi | G06N 20/00 |
| 2019/0392487 | A1* | 12/2019 | Duke | G06N 20/00 |
| 2020/0202194 | A1* | 6/2020 | Wu | G06N 20/00 |
| 2020/0358599 | A1* | 11/2020 | Baracaldo Angel | H04L 9/085 |
| 2021/0158144 | A1* | 5/2021 | Coulombe | G06N 3/0895 |
| 2021/0303638 | A1* | 9/2021 | Zhong | G06F 18/231 |
| 2022/0051132 | A1* | 2/2022 | Oke | G06F 40/30 |
| 2022/0248190 | A1* | 8/2022 | Garg | H04W 4/16 |

OTHER PUBLICATIONS

Li, Lei. "For Generating a Text Title of Method and Device" CN 201811455644 A, PE2E English Translation, Feb. 1, 2019. (Year: 2019).*

Connect, the Smarter Way to Connect, Code of Practice for Entities of Ecosystem (CoP-Entities), downloaded on May 24, 2021, pp. 1-20, https://www.connectzone.in/cms/CoP-Entities-v1.pdf.

Amazon Pinpoint, "Requesting sender IDs for SMS messaging with Amazon Pinpoint", Dec. 1, 2016, updated Jan. 14, 2021, pp. 1-3, https://docs.aws.amazon.com/pinpoint/latest/userguide/doc-history.html.

Jaisinghani, P., "Set Your Business Brand as Your Sender ID", Dec. 28, 2017, pp. 1-12, MSG91, https:/msg91.com/guide/set-your-business-brand-as-your-sender-id-in-bulk-sms/.

NLP Help Center, What are the types of SMS and SMS Header (or Sender ID)?, downloaded May 24, 2021, pp. 1-4, https://nlp.nexterp.in/helpcenter/what-are-the-types-of-sms-and-sms-header-or-sender-id/.

* cited by examiner

ELECTRONIC MESSAGE HEADER RECOMMENDATION AND APPROVAL

BACKGROUND

This disclosure is directed to computers, and computer applications, and more particularly to computer-implemented methods and systems for recommending and/or approving a header for an electronically communicated message.

In current messaging systems, a sender who would like to send a message in commercial communications, such as promotional messages, needs to register a header which would identify the sender. The header is shown as the "message from" information for the promotional messages. The header signifies who is the sender and thus plays an important role to grab the attention of the customer/recipient. The header provides immediate information to identify the sender but may also provide information identifying the content of the message.

In the current header registration process, headers are provided by the registering entity or can be requested by the sender. This results in a high probability of the header being similar to an existing header. Moreover, with the header being chosen by the sender, the headers can be easily obtained by actors that can pose as another. In addition, the message header chosen may include special characters that can cause a threat to the system by means of phishing.

SUMMARY

In some embodiment, a computer implemented method for recommending a header for a message is disclosed. In one embodiment, the method includes the steps of receiving a request from an entity for a header for a message, generating at least one proposed header in response to the request based on at least one of a name of the entity, a brand of the entity, a category of a product identified in the message and content of the message, classifying the at least one proposed header using a machine learning model trained based on historical complaints on previously used headers related to the at least one of a name of the entity, a brand of the entity, a category of a product identified in the message and content of the message used to generate the at least one proposed header and recommending at least one of the at least one proposed header to the requesting entity based on the classification. In one embodiment, the at least one proposed header is generated using a machine learning model trained based on the at least one of a name of the entity, a brand of the entity, a category of a product identified in the message and content of the message.

In one embodiment, in a case where the request for a header includes a specific header requested by the entity, the method includes classifying the specific header using a machine learning model trained based on historical complaints related to the at least one of a name of the entity, a brand of the entity, a category of a product identified in the message and content of the message, approving or disapproving the specific header based on the classification. In one embodiment, in a case where the specific header is approved, receiving a selection of one of the recommended header and the approved specific header from the entity and registering to the entity the selected header for the message.

In one embodiment, the method includes training the machine learning model by parsing the previously registered headers of the historical complaints into a plurality of datasets, computing a Levenshtein distance comprising a number of edits required to get the same header using the datasets, forming a trigram from the previously registered headers, computing a Jaccard distance and learning a decision tree classifier using the plurality of historical complaints datasets, the Levenshtein distance and the Jaccard distance, that can learn rules based on the Levenshtein and Jaccard distances that may lead to wrongful association activities. In one embodiment, the method includes retrieving a list of registered headers similar to the at least one proposed header, computing the Levenshtein and Jaccard distances between each pair of the at least one proposed header and the similar registered header and using the rules from the decision tree classifier to flag whether or not the specific header should be approved.

In one embodiment, the method may include training the machine learning model to learn a threshold wherein headers having a classification greater than the threshold are not recommended as having a high probability of being wrongly associated with the requesting entity and headers having a classification lower than the threshold are recommended as having a high probability of not being wrongly associated with the requesting entity.

In one embodiment, the method may include approving the at least one recommended header based on a dissimilarity variance with distributed registered headers. In one embodiment, the method may include approving the at least one recommended header using a distributed computation protocol while preserving privacy of the entity across a network of message operators.

A computer system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment, there is disclosed a system and method that recommends or approves a header for a message based on past complaints on headers of a similar nature that were previously registered, as well as information related to the sender such as one or more of the categories of product dealt in by the sender, the name of the sender, a brand of the sender and content of the intended message. In one embodiment, the recommendation is provided by an artificial intelligence (AI) model using machine learning. In one embodiment, the system and method approve a header submitted by the sender based on the AI model trained using the historical complaints data of wrong association and the list of registered headers. In one embodiment, a dictionary-based AI model recommends headers based on the category and subcategory of the products dealt in by the sender. In one embodiment, different header options can be provided by the system based on the brand, a sub-brand, or it can be derived based on the content of the message which the sender would like to send. The method and system to recommend headers that avoid misusage of brand names and popularity of the sender such that the probability of activities from wrong association can be minimized. In one embodiment, the system and method approve the recommended header based on dissimilarity variance with distributed registered headers across the network of operators. In one embodiment, the method and system approve a new header using a distributed computation protocol while preserving privacy of the sender across the network of operators. In one embodiment, the method and system provide recommended headers with efficient and differential scrubbing capability based on the association between the recommended header with the category and message template.

The method and system are an improvement over prior art header registration systems by providing optimal granularity for generating headers for recommendation thereby avoiding misusage of brand names and minimizing the probability of activities from wrong association.

Figure 1:
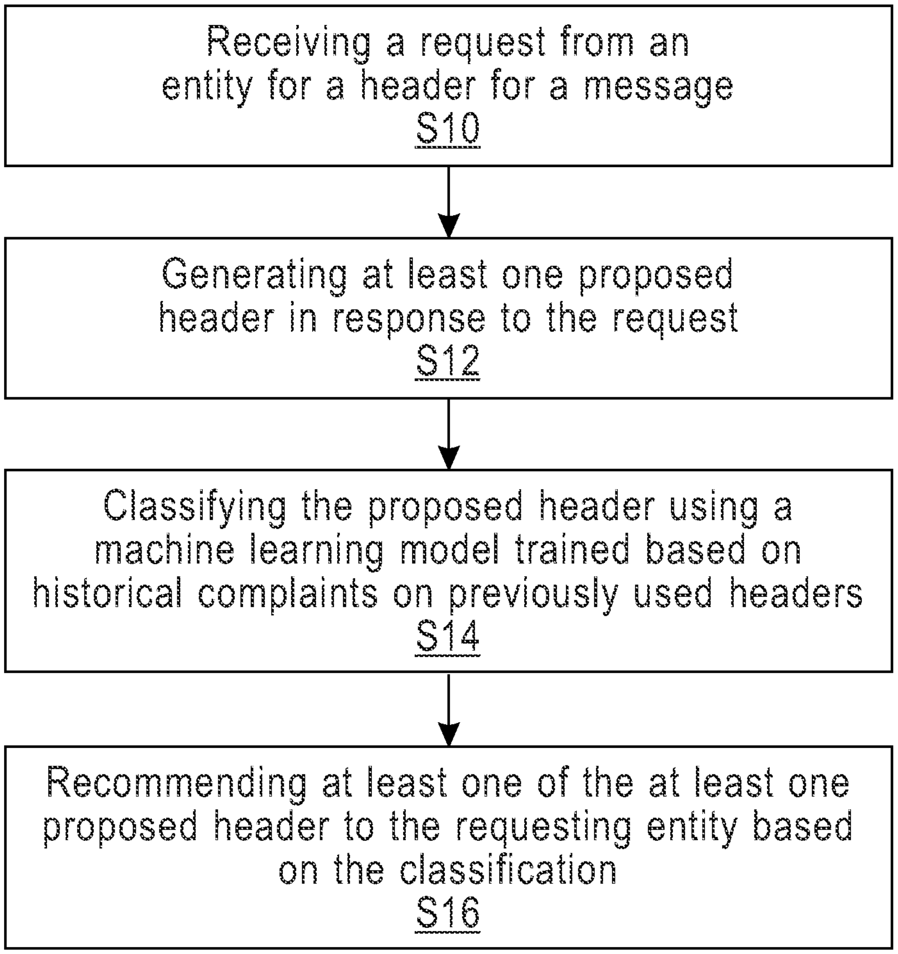
FIG. 1 is a flow diagram of one embodiment of a method disclosed in this specification.

FIG. 1 is a flow diagram of one embodiment of a method for recommending a header for a message. In step S10, a request from an entity for a header for a message is received. In step S12 at least one proposed header is generated in response to the request. In one embodiment, in step S12, the header recommendation may be based on at least one of a name of the entity, a brand of the entity, a category of a product identified in the message and content of the message. In one embodiment, the at least one proposed header is generated using a machine learning model trained based on the at least one of a name of the entity, a brand of the entity, a category of a product identified in the message and content of the message.

In step S14, the at least one proposed header is classified using a machine learning model trained based on historical complaints on previously used headers. In one embodiment, in step S14, the classification is based on historical complaints on previously used headers related to the at least one of a name of the entity, the brand of the entity, the category of a product identified in the message and content of the message used to generate the at least one proposed header. In step S16, at least one of the at least one proposed header is recommended to the requesting entity based on the classification. In one embodiment, step S16 includes training the machine learning model to learn a threshold wherein headers having a classification greater than the threshold are not recommended as having a high probability of being wrongly associated with the requesting entity and headers having a classification lower than the threshold are recommended as having a high probability of not being wrongly associated with the requesting entity.

Figure 2:
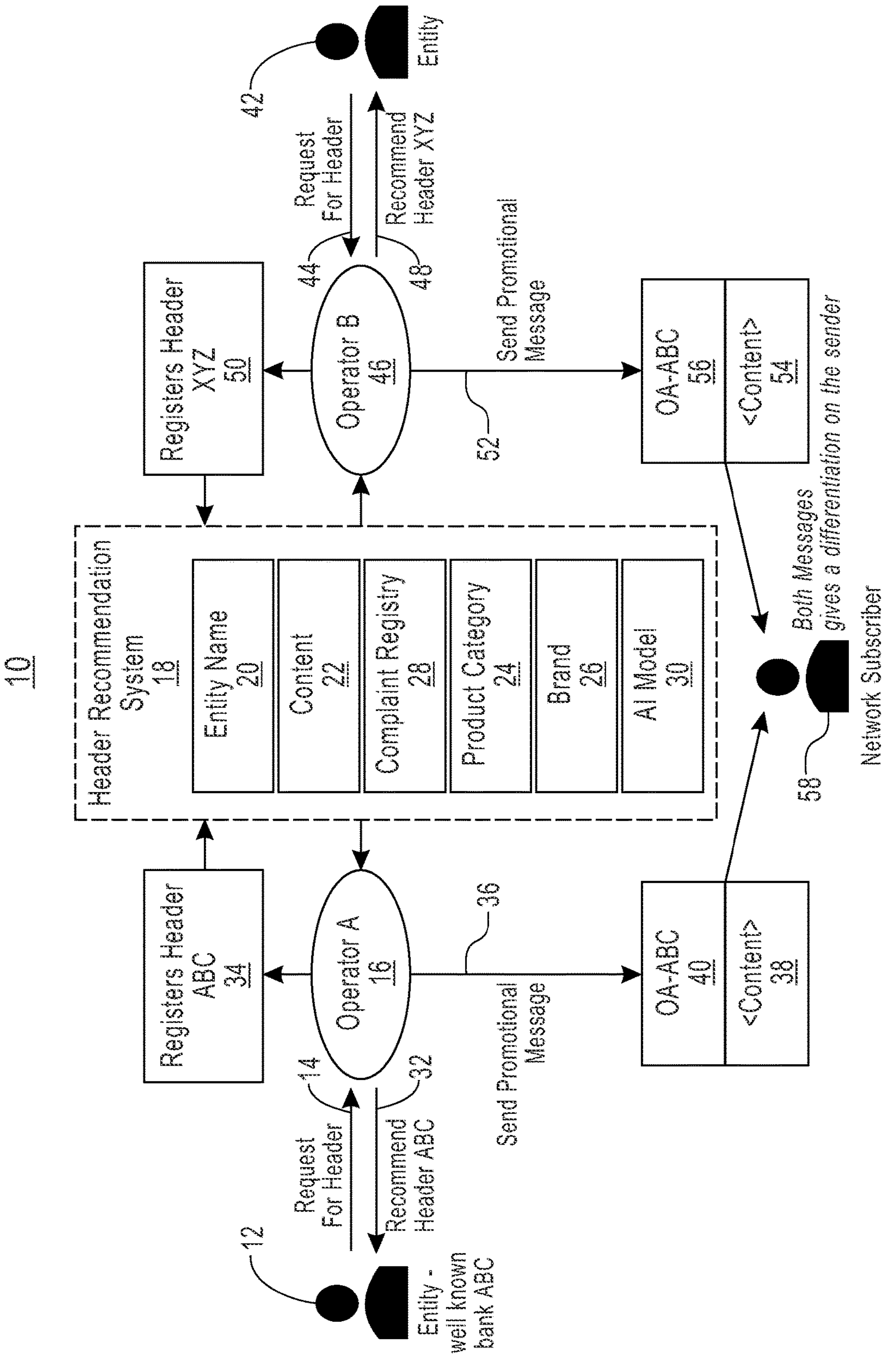
FIG. 2 is a block diagram of one embodiment of the system disclosed in this specification.

FIG. 2 is a block diagram of one embodiment of a system 10 for recommending a header for a message. An entity 12, for example a well know bank ABC, submits a request 14 for a header to operator A of a communications network 16. Communications network 16 may be any network, or component of a network, capable of handling messaging technology, such as telephony communications. In some embodiments, communications network 16 may include an email server and a Short-name Server (SMS). It will be apparent to one of ordinary skill in the art that communications network 16 may be comprised of many different types of systems and components, and as such, should not be limited to any particular configuration. For example, the email and SMS servers may be any suitable device including, but not limited to, a computer, a server, etc., capable of executing instructions and acting as a server (e.g., desktop computer, laptop computer, servers, mobile devices, etc.). In some embodiments, the communications network 16 may include functionality of a web server, thereby allowing messages to be sent using the Internet. The network 16 may provide any message format that requires a header, including, but not limited to: Multimedia Messaging Service (MMS), Enhanced Messaging Service (EMS), Short Message Peer-to-Peer (SMPP), and many other formats.

The operator A of network 16 submits the request for a header to the header recommendation system 18. The header recommendation system 18 includes several data repositories, including Entity Name 20, Message Content 22, Product Category 24, and Brand 26. The data repositories also include Complaint Registry 28. The header recommendation system 18 also includes AI model 30.

The header recommendation system 18 receives the request 14 from the entity 12 for a header for a message. The header recommendation system 18 generates at least one proposed header in response to the request based on information from one or more of the name of the entity from repository 20, a brand of the entity from repository 26, a category of a product identified in the message from repository 24 and content of the message from repository 22. In one embodiment, the at least one proposed header is generated using the machine learning AI model 30 trained based on the at least one of the name of the entity, the brand of the entity, the category of the product identified in the message and content of the message.

The header recommendation system 18 classifies the at least one proposed header using the AI model 30. In some embodiments, the AI model 30 is a machine learning model trained based on historical complaints in complaint registry 28. The classification is based on complaints on previously used headers related to the at least one of the name of the entity, the brand of the entity, the category of a product identified in the message and content of the message used to generate the at least one proposed header.

The header recommendation system 18 recommends at least one of the at least one proposed header to the requesting entity 12 based on the classification. For example, recommendation 32 of header ABC is sent to the entity 12. In one embodiment, the AI machine learning model 30 is trained to learn a threshold wherein headers having a classification greater than the threshold are not recommended as having a high probability of being wrongly associated with the requesting entity and headers having a classification lower than the threshold are recommended as having a high probability of not being wrongly associated with the requesting entity.

Upon acceptance of the recommended header 32 by the requesting entity 12, The operator A of network 16 registers the header in header registry 34 and transmits at 36 the message content 38 with the ABC header 40. Header 40 may also include characters identifying the network operator, in this case shown as OA.

Also shown in FIG. 2 is an entity 42, for example an actor looking to wrongfully capitalize on the ABC bank name, who submits a request 44 for a specific header ABC to operator B of a communications network 46. The operator B of network 46 submits the request 44 for header ABC to the header recommendation system 18. The header recommendation system 18 receives the request 44 from the entity 42 for a header for a message. The header recommendation system 18 classifies the specifically requested header using the AI model 30 trained based on historical complaints in complaint registry 28 related to the name of the entity 42, a brand of the entity 42, a category of a product identified in the message and content of the message. The header recommendation system 18 approves or disapproves the specific header based on the classification. In one embodiment, the AI machine learning model 30 is trained to learn a threshold wherein headers having a classification greater than the threshold are disapproved as having a high probability of being wrongly associated with the requesting entity and headers having a classification lower than the threshold are approved as having a high probability of not being wrongly associated with the requesting entity. In this example, because of past complaints against entity 42 registering headers related to the ABC bank name, brand, product category and/or message content, the specific header ABC requested by entity 42 is disapproved. Instead, header recommendation system 18 recommends header XYZ at 48.

Upon acceptance of the recommended header 48 by the requesting entity 42, The operator B of network 46 registers the header XYZ in header registry 50 and transmits at 52 the message content 54 with the header OB-XYZ 56. As a result of the header recommendation system 18, both messages 38 and 54 give a clear differentiation to the network subscriber 58 on the sender based on the different headers 40 and 56.

Figure 3:
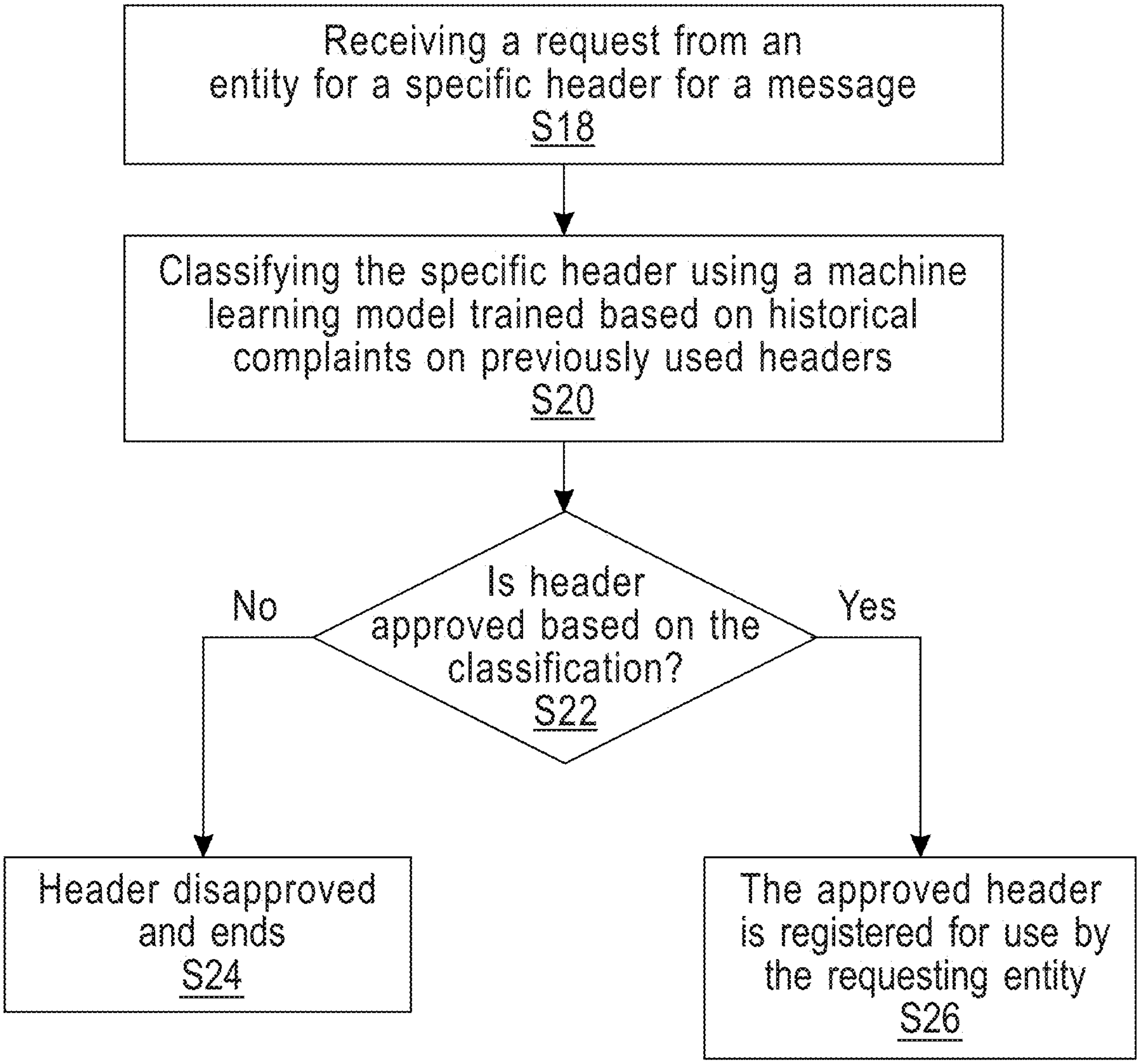
FIG. 3 is a flow diagram of one embodiment of a method disclosed in this specification.

FIG. 3 is a flow diagram of one embodiment of a method for recommending a header for a message. In step S18, a request from an entity for a specific header for a message is received. In step S20 the specific header is classified using a machine learning model trained based on historical complaints on previously used headers. In one embodiment, in step S20, the classification is based on historical complaints on previously used headers related to the name of the entity, a brand of the entity, a category of a product identified in the message and content of the message. In step S22, the specific header is approved or disapproved based on the classification. In one embodiment, step S22 includes training the machine learning model to learn a threshold wherein headers having a classification greater than the threshold are disapproved as having a high probability of being wrongly associated with the requesting entity and headers having a classification lower than the threshold are approved as having a high probability of not being wrongly associated with the requesting entity. If the header is disapproved, No at step S22, the method ends at S24. If the header is approved, Yes at step S22, the approved header is registered for use by the requesting entity at step S26.

In one embodiment headers being registered by the operator may include characters to identify certain meta-data which at a later point in time during scrubbing would be useful to enhance the scrubbing process. In addition, in one embodiment, the added characters to identify certain metadata could also be useful in handling of the complaints with faster resolutions. In one embodiment, the added characters can reduce the number of validation steps for a recommended header as the category, and relation with a template would be correctly mapped.

In one embodiment, the header may include a prefix which identifies if the header finally registered is recommended by the system or selected by the requesting entity. This information can help at later stages of complaint handling and in analytics to determine which kind of header have a high percentage of being wrongly associated and may be the result of a fraud. In one embodiment, the prefix can be used by the header recommendation system 18 to determine which headers have a higher complaint rate in comparison and flagging those headers that have a rate above a threshold for disapproval as being possibly wrongly associated.

In one embodiment, the first character of the header can be set as an R for recommended or S for selected. For example, the header OA-RG-ABCBNK specifies a system recommended header for the entity ABC, whereas OA-SL-XYZBNK specifies a header which has been chosen by entity XYZ.

In one embodiment, the header may include characters which identifies if the sender is a local entity or a global entity. For example, the first character could be G for global or L for local, thus OA-RG-ABCBNK specifies a global entity ABC, whereas OA-SL-XYZBNK specifies a local entity XYZ.

Figure 4:
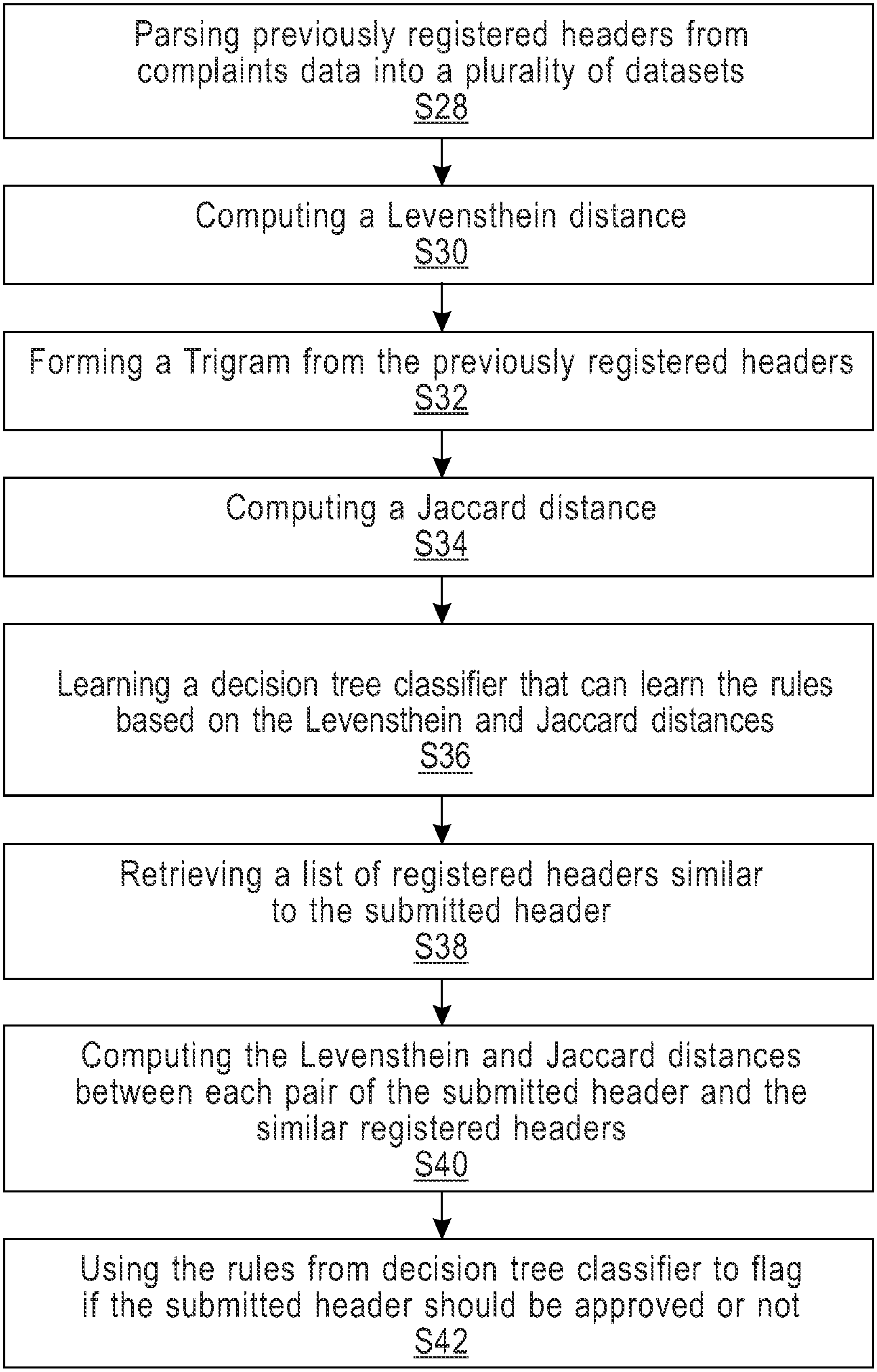
FIG. 4 is a flow diagram of one embodiment of a method disclosed in this specification.

FIG. 4 is a flow diagram of one embodiment of a method to approve or disapprove a header proposed by a requesting entity. The data used in the method includes registered headers, for example from header registries 34 and 50, the header submitted by the entity and past complaints against the entity and similar headers from complaint registry 28. The past complaint data may include the original header, the proposed header, the company name, and whether the header was marked wrongly associated or not. The method includes first training the AI machine learning model using historical data and second executing the model for the submitted header.

As shown in FIG. 4, training the model includes step S28 of parsing the previously registered headers form the past complaints data into a plurality of datasets. Step S30 includes computing a Levenshtein distance. The Levenshtein distance is a string metric for measuring the difference between two headers. The Levenshtein distance between two words is the minimum number of single-character edits (insertions, deletions or substitutions required to change one word into the other. In step S30, computing the Levenshtein distance results in the number of edits required to get the same header.

Step S32 includes forming a Trigram from the previously registered headers. Trigrams are a special case of the n-gram, where n is 3, the n-gram being a contiguous sequence of n items from the text of the header. The trigram is used for performing statistical analysis of the text of the header. The items can be phonemes, syllables, letters, words or base pairs of the header.

Step S34 includes computing a Jaccard distance. Jaccard distance measures the dissimilarity between the data sets obtained from the parsed headers. The Jaccard distance is obtained by subtracting the Jaccard similarity coefficient from 1.

Step S36 includes learning a decision tree classifier using historical complaints data, the Levenshtein distance and the Jaccard distance that can learn the rules based on the Levenshtein and Jaccard distances that lead to wrongful activities.

The execution of the model for the submitted header includes step S38 of retrieving a list of registered headers similar to the submitted header, step S40 of computing the Levenshtein and Jaccard distances between each pair of the submitted header and the similar registered headers and step S42 of using the rules from the decision tree classifier to flag if the submitted header should be approved or not.

Figure 5:
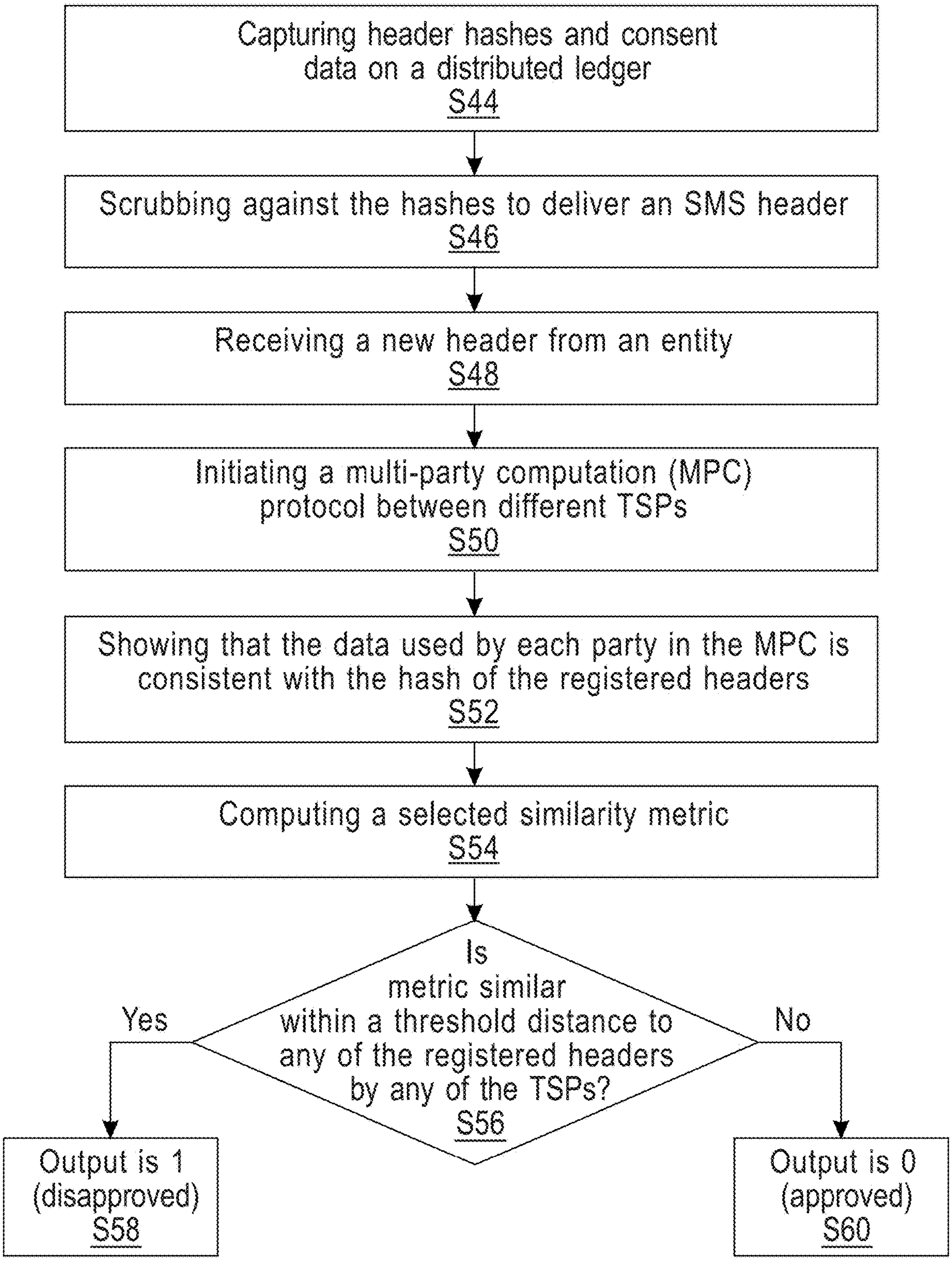
FIG. 5 is a flow diagram of one embodiment of a method disclosed in this specification.

FIG. 5 is a flow diagram of one embodiment of a method to approve or disapprove a proposed header based on a dissimilarity variance with distributed registered headers. The data used in the method may include a hash of the registered headers by each entity, for example from header registries 34 and 50, the header submitted by the entity and past complaints against the entity and similar headers from complaint registry 28. The past complaint data may include the original header, the proposed header, the company name, and whether the header was marked wrongfully associated or not. In one embodiment of the method, in step S44, the header hashes and consent data are captured on a distributed ledger. In one embodiment, the distributed ledger is a consensus of replicated, shared, and synchronized digital data geographically spread across multiple network operators. In some embodiments, the distributed ledger database is spread across several nodes on a peer-to-peer network, where each replicates and saves an identical copy of the ledger and updates itself independently. When a ledger update happens, each node constructs the new transaction, and then the nodes vote by consensus algorithm on which copy is correct. Once a consensus has been determined, all the other nodes update themselves with the new, correct copy of the ledger. Security is accomplished through cryptographic keys and signatures.

In step S46, regular scrubbing is done against these hashes to deliver an SMS header. In step S48, a new header is received from an entity by the network operator, such as a telephone service provider (TSP). In step S50 the TSP initiates set up of a multi-party computation (MPC) protocol between different TSPs. In step S52 the TSP shows that the data used by each party in the MPC is consistent with the hash of the header registered in Step S46. In step S54, a selected similarity metric is computed. The similarity may be any one of a Jaccard distance, a Hamming distance, a Levenshtein or other similar distance metric. In one embodiment, the Hamming distance measures binary data strings of the headers and the distance between two strings of equal length is the number of bit positions at which the bits are different. In step S56 if the metric is similar within a threshold distance to any of the registered headers by any of the TSPs, in S58 the output will be 1 (disapproved) else in step S60 the output will be 0 (approved).

In one embodiment, the MPC Task Specification may take the form:

```
{
“name”: “n-MPC-jaccard”,
“label”: “mpc-task-jaccard”,
“inputs”:
 private_ inputs: [“dtsp_1”,“dtsp_2”, ..., “dtsp_n”, “h1”]
 public_inputs: [ “dtsp1_hash_pub”,...”dtspn_hash_pub”],
“circuit” : [“Jaccard”]
“outputs”:[“max_Jaccard_Similarity”],
“protocol”:
 sharing_scheme: “shamir”
 majority: “honest”
 malicious: “true”
“library”: “SCALE-MAMBA”
}
{
“name”: “n-MPC-hamming”,
“label”: “mpc-task-hamming”,
“inputs”:
 private_ inputs: [“g1”,“g2”, ..., “gn”]
 public_inputs: [ “g1_hash_pub”,...”gn_hash_pub”],
“circuit” : [“Hamming”]
“outputs”:[“max_hamming_Similarity”],
“protocol”:
 sharing_scheme: “shamir”
 majority: “honest”
 malicious: “true”
“library”: “SCALE-MAMBA”
}
```

In one embodiment, a new header approval based on MPC execution may take the form: registered header public data grounded by each TSP is:

```
Data_tsp1_hash
Data_tsp2_hash
...
Data_tspn_hash
For similarity computation in (Jaccard,
Hamming, Levenshtein) {
Private data = [data_tsp1, ... , data_tspn,
proposed header]
Execute corresponding MPC task to compute
the maximum similarity Score
}
Compare if any of the similarity scores
is > Threshold.
If yes, then reject the header
Else, accept the proposed header
```

Figure 6:
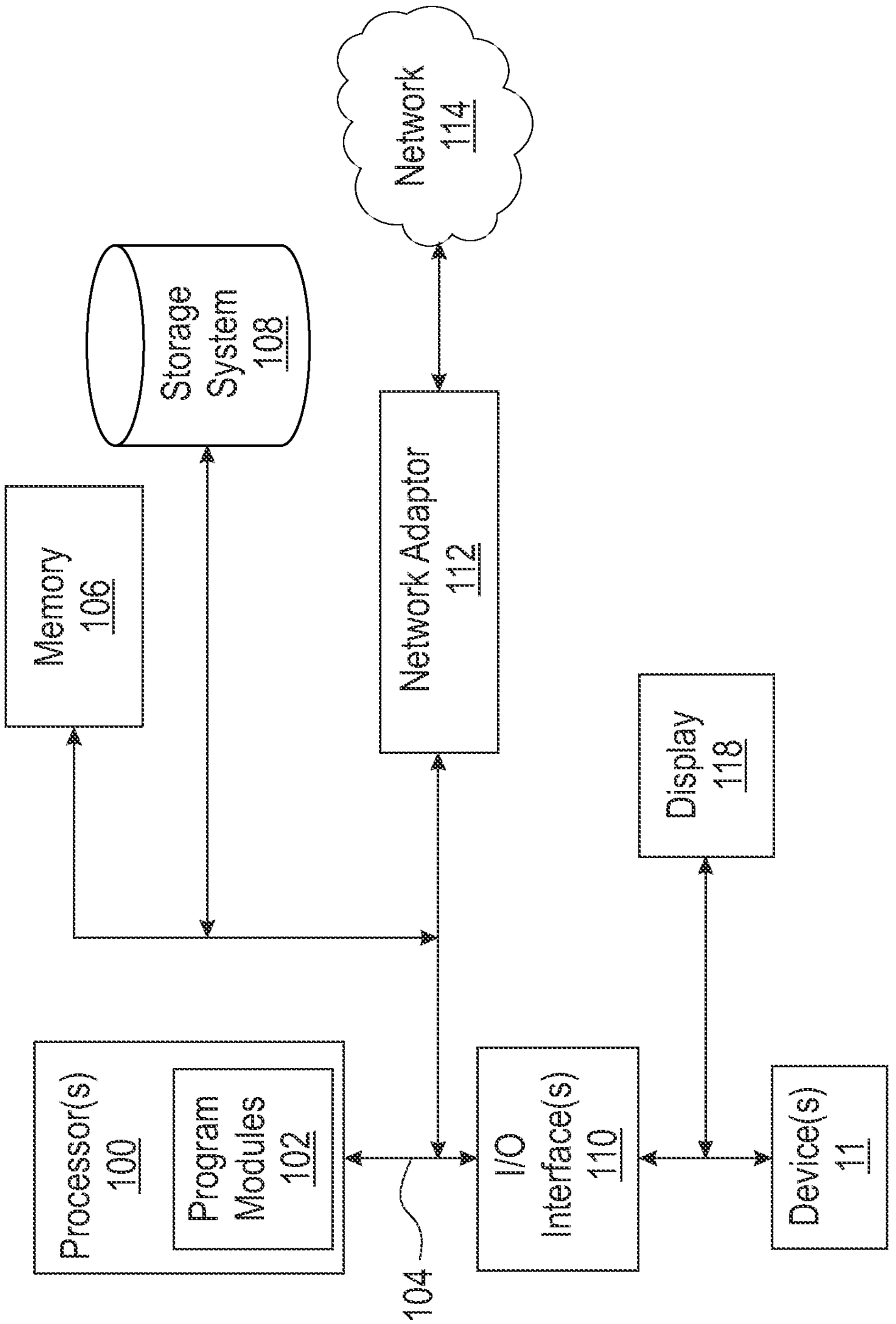
FIG. 6 is a block diagram of an exemplary computing system suitable for implementation of the embodiments of the invention disclosed in this specification.

FIG. 6 illustrates a schematic of an example computer or processing system that may implement the method for recommending and/or approving a header for a message in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein, such as the methods performed by the header recommendation system 18 of FIG. 2. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for recommending a header for a message comprising:

parsing SMS and email headers registered in a historical complaints registry on a communications network server based on a wrong identity association with an entity name or brand into a plurality of datasets based on at least one of a name of an entity, a brand of an entity, a category of a product or content of a message, the registered SMS and email headers identifying a sender of communications network messages;

training a machine learning model on the plurality of datasets to learn a decision tree classifier based a dissimilarity variance with the registered headers using the plurality of historical complaints datasets, the machine learning model being on the communications network server;

receiving at the communications network server a request from an entity for an SMS or email header for a specific message;

training the machine learning model on at least one of a name of the requesting entity, a brand of the requesting entity, a category of a product identified in the specific message or content of the specific message and generating at least one proposed SMS or email header in response to the request;

classifying the at least one proposed SMS or email header using the trained machine learning model based on the decision tree classifier; and selecting at least one of the at least one proposed SMS or email header based on the classification.

2. The computer implemented method of claim 1, wherein the at least one proposed header is generated using a machine learning model trained based on the at least one of a name of the entity, a brand of the entity, a category of a product identified in the message and content of the message.

3. The computer implemented method of claim 1, further comprising including in the at least one recommended header at least one character to identify meta-data configured to be used during at least one of a scrubbing process or a complaint handling process.

4. The computer implemented method of claim 1, wherein in a case where the request for a header includes a specific header requested by the entity, the method further comprises:

classifying the specific header using a machine learning model trained based on historical complaints related to the at least one of a name of the entity, a brand of the entity, a category of a product identified in the message or content of the message;

approving or disapproving the specific header based on the classification;

in a case where the specific header is approved, receiving a selection of one of the recommended header and the approved specific header from the entity; and registering to the entity the selected header for the message.

5. The computer implemented method of claim 4, further including training the machine learning model for classifying the specific header or for classifying the at least one proposed header by:

parsing the previously registered headers of the historical complaints into a plurality of datasets;

computing a Levenshtein distance comprising a number of edits required to get the same header using the datasets;

forming a trigram from the previously registered headers;

computing a Jaccard distance; and learning a decision tree classifier using the plurality of historical complaints datasets, the Levenshtein distance and the Jaccard distance that can learn rules based on the Levenshtein and Jaccard distances.

6. The computer implemented method of claim 5, wherein classifying the specific header using a machine learning model comprises retrieving a list of registered headers similar to the specific header, computing the Levenshtein and Jaccard distances between each pair of the specific header and the similar registered header and using the rules from the decision tree classifier to flag whether or not the specific header should be approved.

7. The computer implemented method of claim 1, further comprising approving the at least one recommended header based on a dissimilarity variance with distributed registered headers.

8. The computer implemented method of claim 1, further comprising approving the at least one recommended header using a distributed computation protocol while preserving privacy of the entity across a network of message operators.

9. The computer implemented method of claim 1, further comprising training the machine learning model to learn a threshold wherein headers having a classification greater than the threshold are not recommended as having a high probability of being wrongly associated with the requesting entity and headers having a classification lower than the threshold are recommended as having a high probability of not being wrongly associated with the requesting entity.

10. A computer system for recommending a header for a message, comprising:

one or more computer processors;

one or more non-transitory computer-readable storage media;

program instructions, stored on the one or more non-transitory computer-readable storage media, which when implemented by the one or more processors, cause the computer system to perform the steps of:

parsing SMS and email headers registered in a historical complaints registry on a communications network server based on a wrong identity association with an entity name or brand into a plurality of datasets based on at least one of a name of an entity, a brand of an entity, a category of a product or content of a message, the registered SMS and email headers identifying a sender of communications network messages;

training a machine learning model on the plurality of datasets to learn a decision tree classifier based a dissimilarity variance with the registered headers using the plurality of historical complaints datasets, the machine learning model being on the communications network server;

receiving at the communications network server a request from an entity for an SMS or email header for a specific message;

training the machine learning model on at least one of a name of the requesting entity, a brand of the requesting entity, a category of a product identified in the specific message or content of the specific message and generating at least one proposed SMS or email header in response to the request;

classifying the at least one proposed SMS or email header using the trained machine learning model based on the decision tree classifier; and selecting at least one of the at least one proposed SMS or email header based on the classification.

11. The computer system of claim 10, wherein the at least one proposed header is generated using a machine learning model trained based on the at least one of a name of the entity, a brand of the entity, a category of a product identified in the message and content of the message.

12. The computer system of claim 10, wherein in a case where the request for a header includes a specific header requested by the entity, the method further comprises:

classifying the specific header using a machine learning model trained based on historical complaints related to the at least one of a name of the entity, a brand of the entity, a category of a product identified in the message or content of the message;

approving or disapproving the specific header based on the classification;

in a case where the specific header is approved, receiving a selection of one of the recommended header and the approved specific header from the entity; and registering to the entity the selected header for the message.

13. The computer system of claim 12, further including training the machine learning model for classifying the specific header or for classifying the at least one proposed header by:

parsing the previously registered headers of the historical complaints into a plurality of datasets;

computing a Levenshtein distance comprising a number of edits required to get the same header using the datasets;

forming a trigram from the previously registered headers;

computing a Jaccard distance; and learning a decision tree classifier using the plurality of historical complaints datasets, the Levenshtein distance and the Jaccard distance that can learn rules based on the Levenshtein and Jaccard distances.

14. The computer system of claim 13, wherein classifying the specific header using a machine learning model comprises retrieving a list of registered headers similar to the specific header, computing the Levenshtein and Jaccard distances between each pair of the specific header and the similar registered header and using the rules from the decision tree classifier to flag whether or not the specific header should be approved.

15. The computer system of claim 10, further comprising training the machine learning model to learn a threshold wherein headers having a classification greater than the threshold are not recommended as having a high probability of being wrongly associated with the requesting entity and headers having a classification lower than the threshold are recommended as having a high probability of not being wrongly associated with the requesting entity.

16. A computer program product comprising:

program instructions on a computer-readable storage medium, where execution of the program instructions using a computer causes the computer to perform a method for recommending a header for a message, comprising:

parsing SMS or email headers registered in a historical complaints registry on a communications network server based on a wrong identity association with an entity name or brand into a plurality of datasets based on at least one of a name of an entity, a brand of an entity, a category of a product or content of a message, the registered SMS and email headers identifying a sender of communications network messages;

training a machine learning model on the plurality of datasets to learn a decision tree classifier based a dissimilarity variance with the registered headers using the plurality of historical complaints datasets, the machine learning model being on the communications network server;

receiving at the communications network server a request from an entity for an SMS or email header for a specific message;

training the machine learning model on at least one of a name of the requesting entity, a brand of the requesting entity, a category of a product identified in the specific message or content of the specific message and generating at least one proposed SMS or email header in response to the request;

classifying the at least one proposed SMS or email header using the trained machine learning model based on the decision tree classifier; and selecting at least one of the at least one proposed SMS or email header to the requesting entity based on the classification.

17. The computer program product of claim 16, wherein the at least one proposed header is generated using a machine learning model trained based on the at least one of a name of the entity, a brand of the entity, a category of a product identified in the message and content of the message.

18. The computer program product of claim 16, wherein in a case where the request for a header includes a specific header requested by the entity, the method further comprises:

classifying the specific header using a machine learning model trained based on historical complaints related to the at least one of a name of the entity, a brand of the entity, a category of a product identified in the message or content of the message;

approving or disapproving the specific header based on the classification;

in a case where the specific header is approved, receiving a selection of one of the recommended header and the approved specific header from the entity; and registering to the entity the selected header for the message.

19. The computer program product of claim 18, further including training the machine learning model for classifying the specific header or for classifying the at least one proposed header by:

parsing the previously registered headers of the historical complaints into a plurality of datasets;

computing a Levenshtein distance comprising a number of edits required to get the same header using the datasets;

forming a trigram from the previously registered headers;

computing a Jaccard distance; and learning a decision tree classifier using the plurality of historical complaints datasets, the Levenshtein distance and the Jaccard distance that can learn rules based on the Levenshtein and Jaccard distances.

20. The computer program product of claim 19, wherein classifying the specific header using a machine learning model comprises retrieving a list of registered headers similar to the specific header, computing the Levenshtein and Jaccard distances between each pair of specific proposed header and the similar registered header, using the rules from the decision tree classifier to flag whether or not the specific header should be approved, and further including training the machine learning model to learn a threshold wherein headers having a classification greater than the threshold are not recommended as having a high probability of being wrongly associated with the requesting entity and headers having a classification lower than the threshold are recommended as having a high probability of not being wrongly associated with the requesting entity.

* * * * *